Aug. 16, 1960

E. N. BILENKER 2,949,364

METHODS OF MAKING BEVERAGE CONCENTRATE

Filed Jan. 9, 1957

INVENTOR.
EUGENE N. BILENKER
BY
ATTORNEY

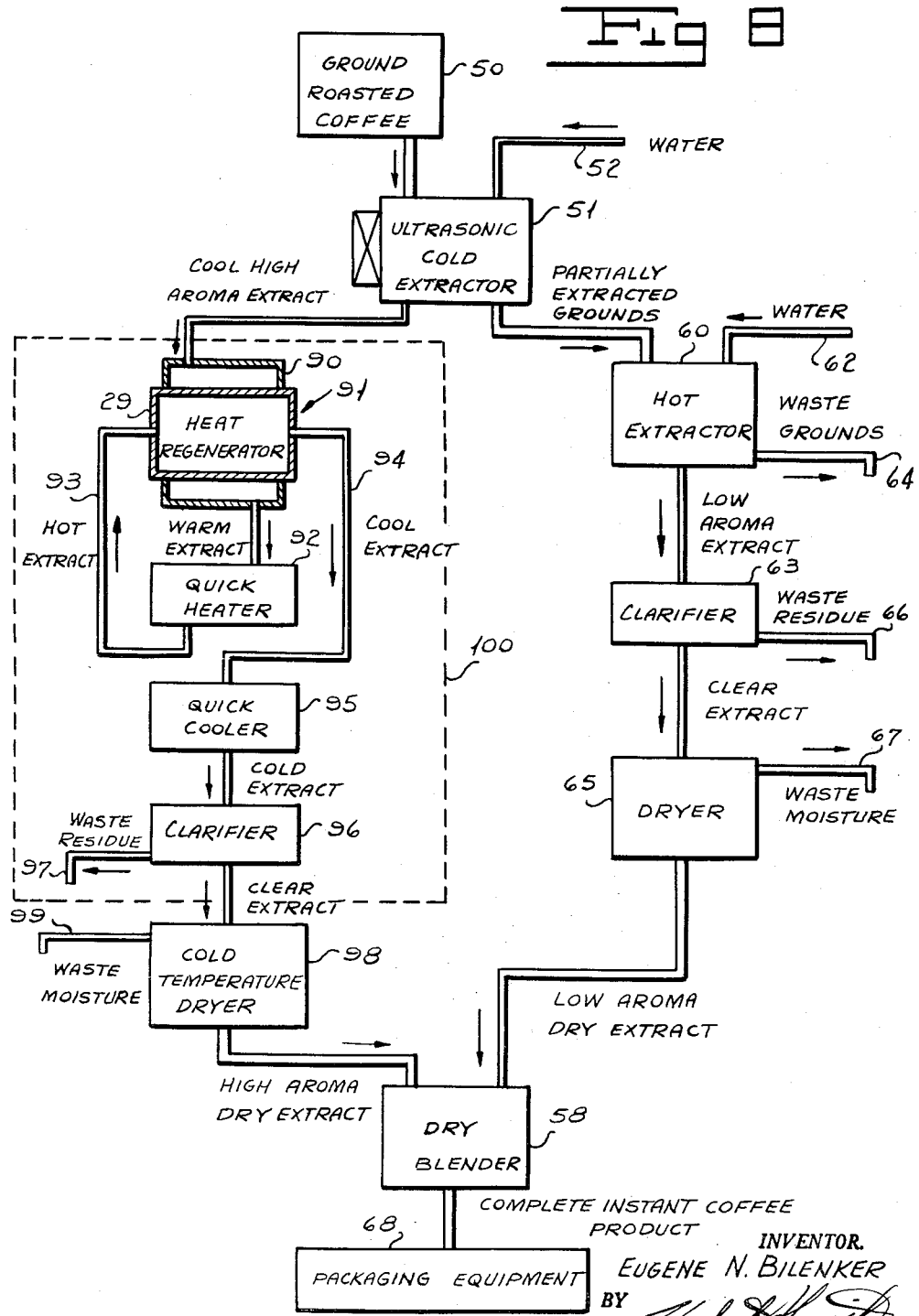

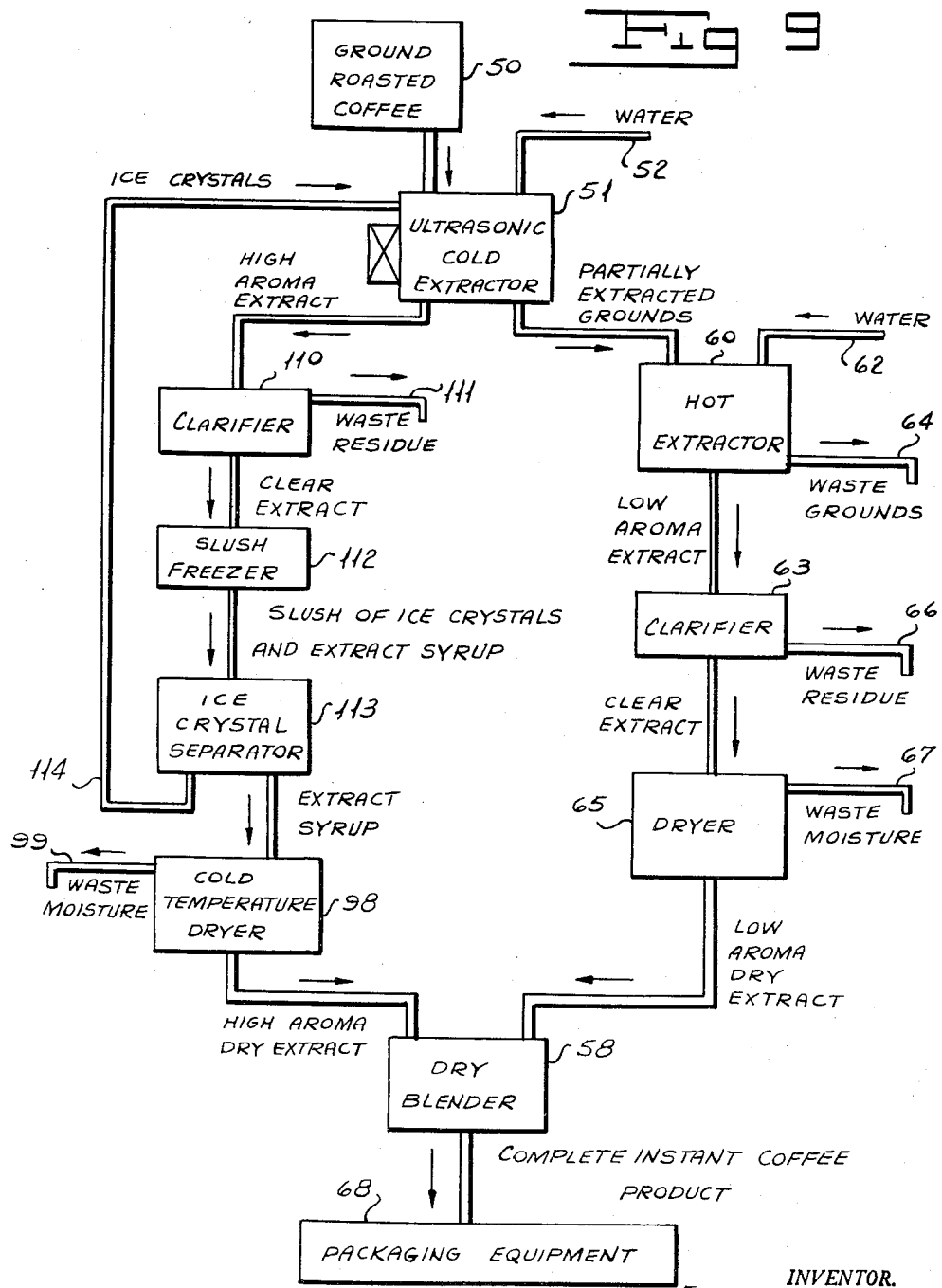

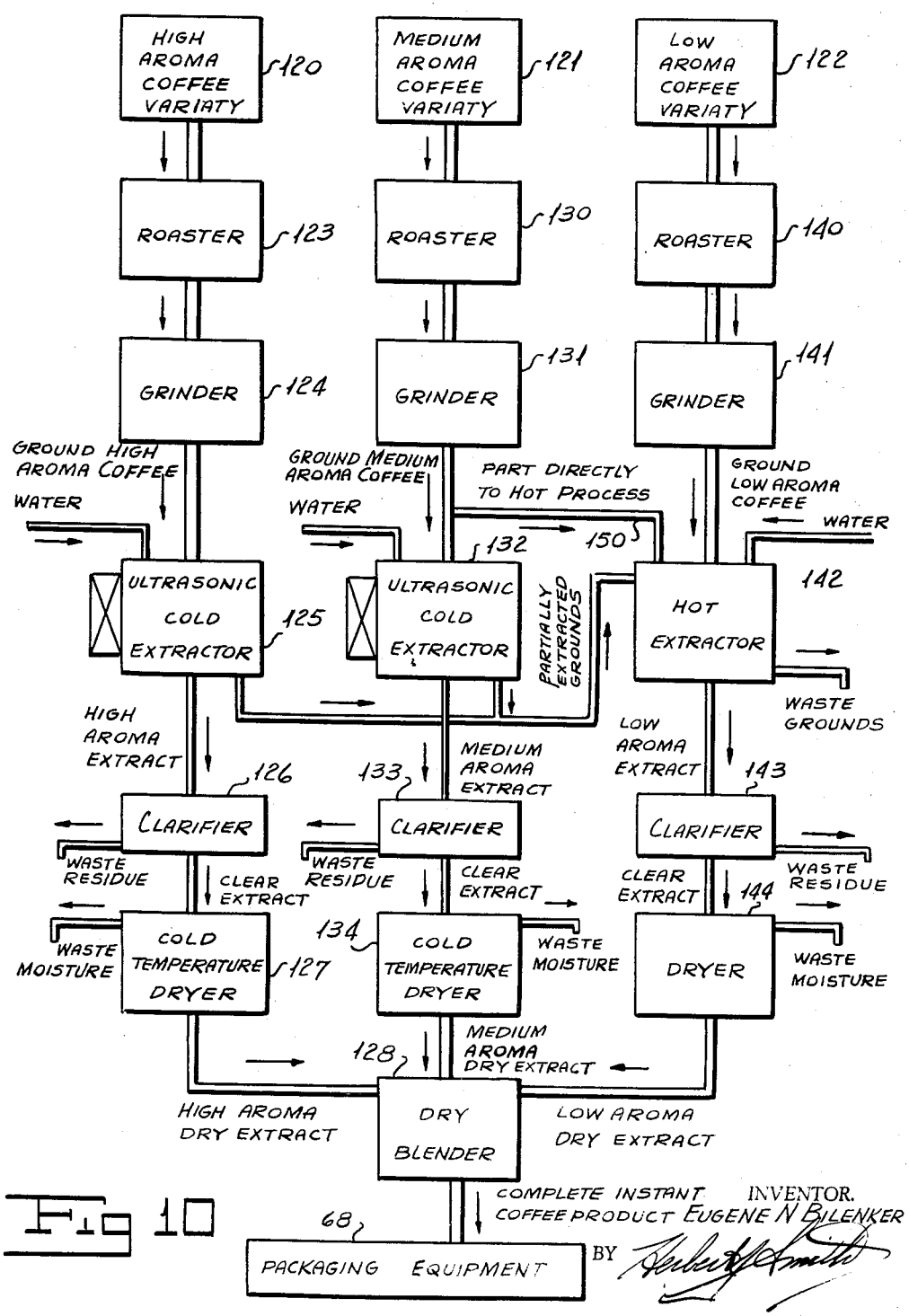

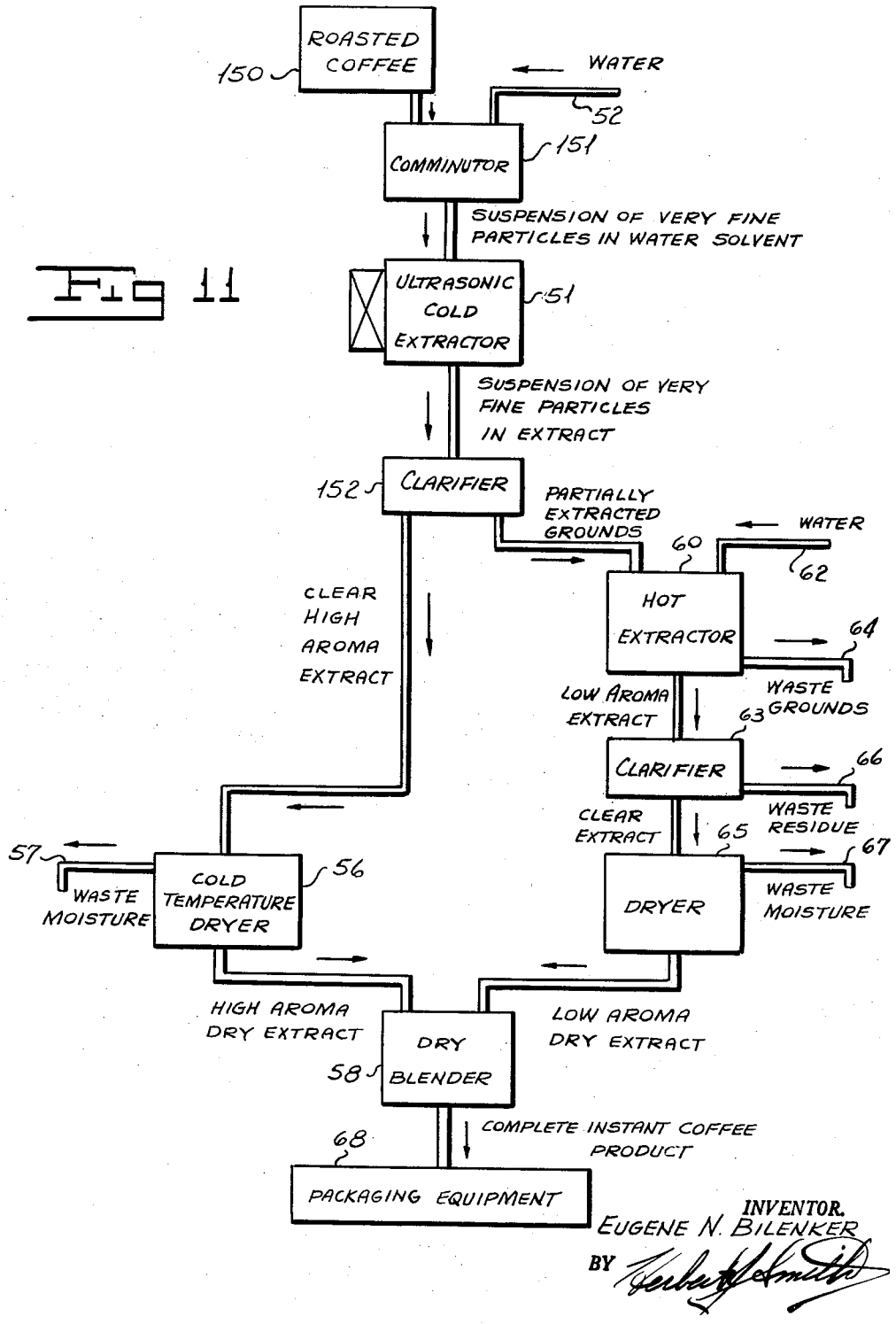

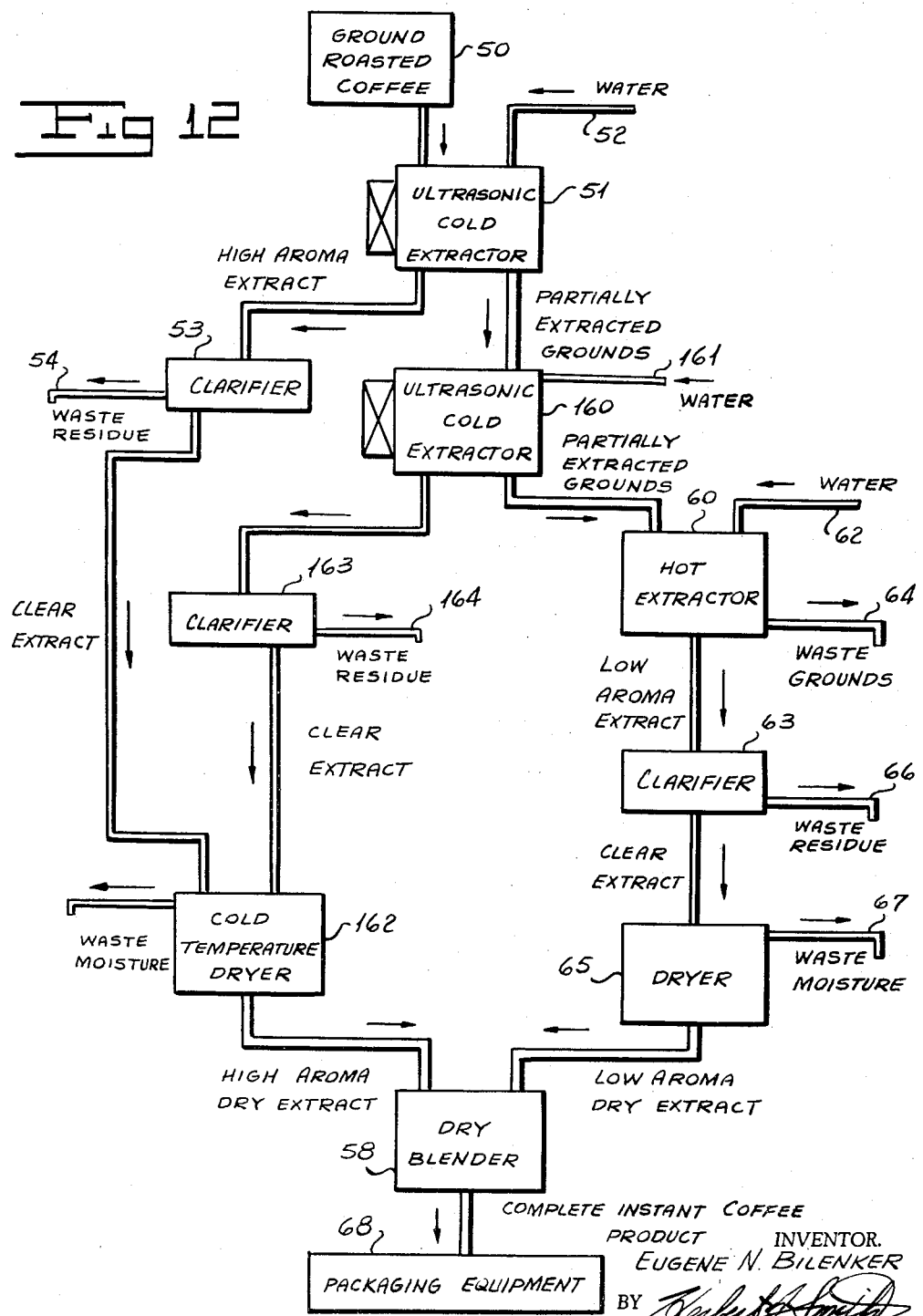

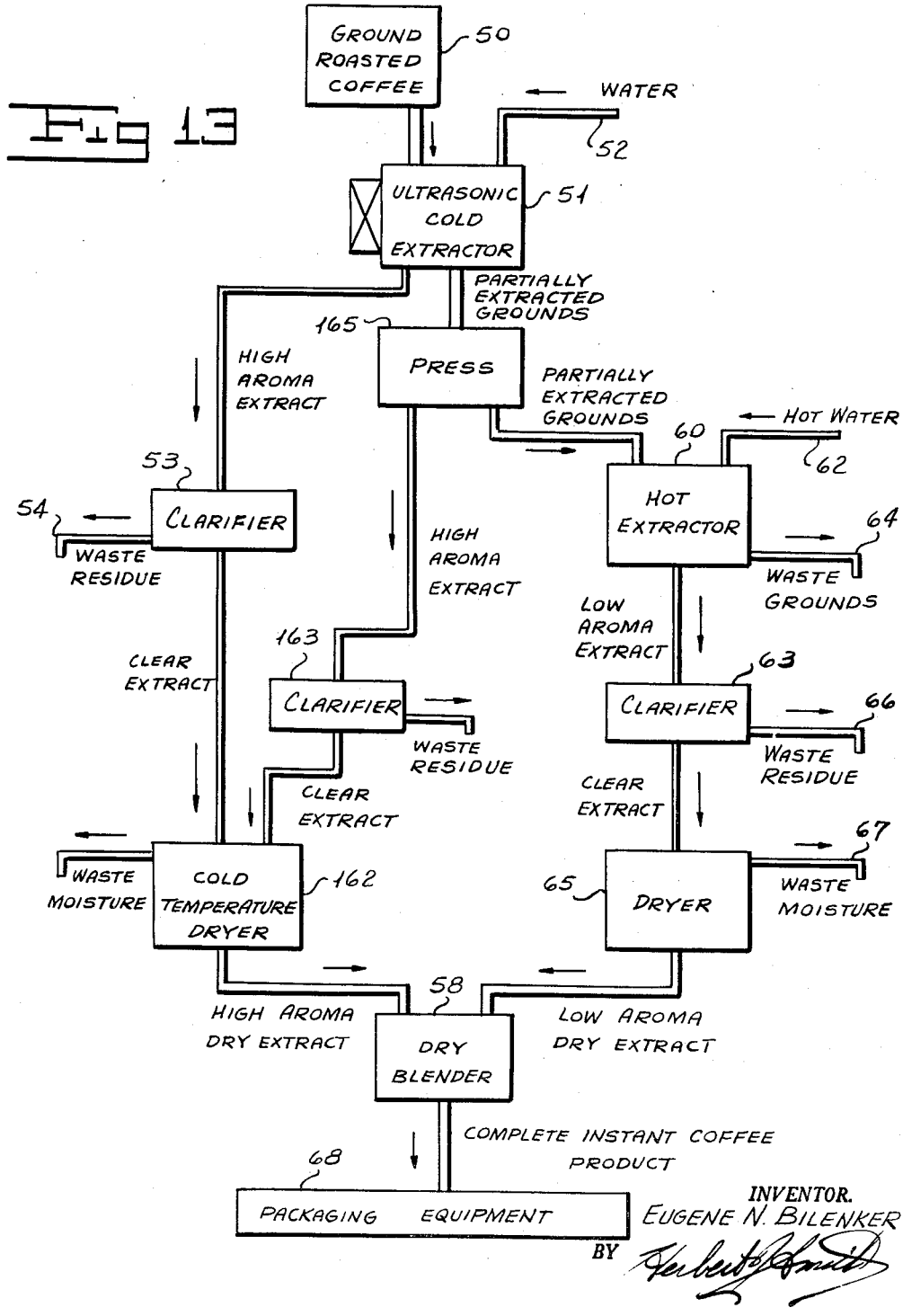

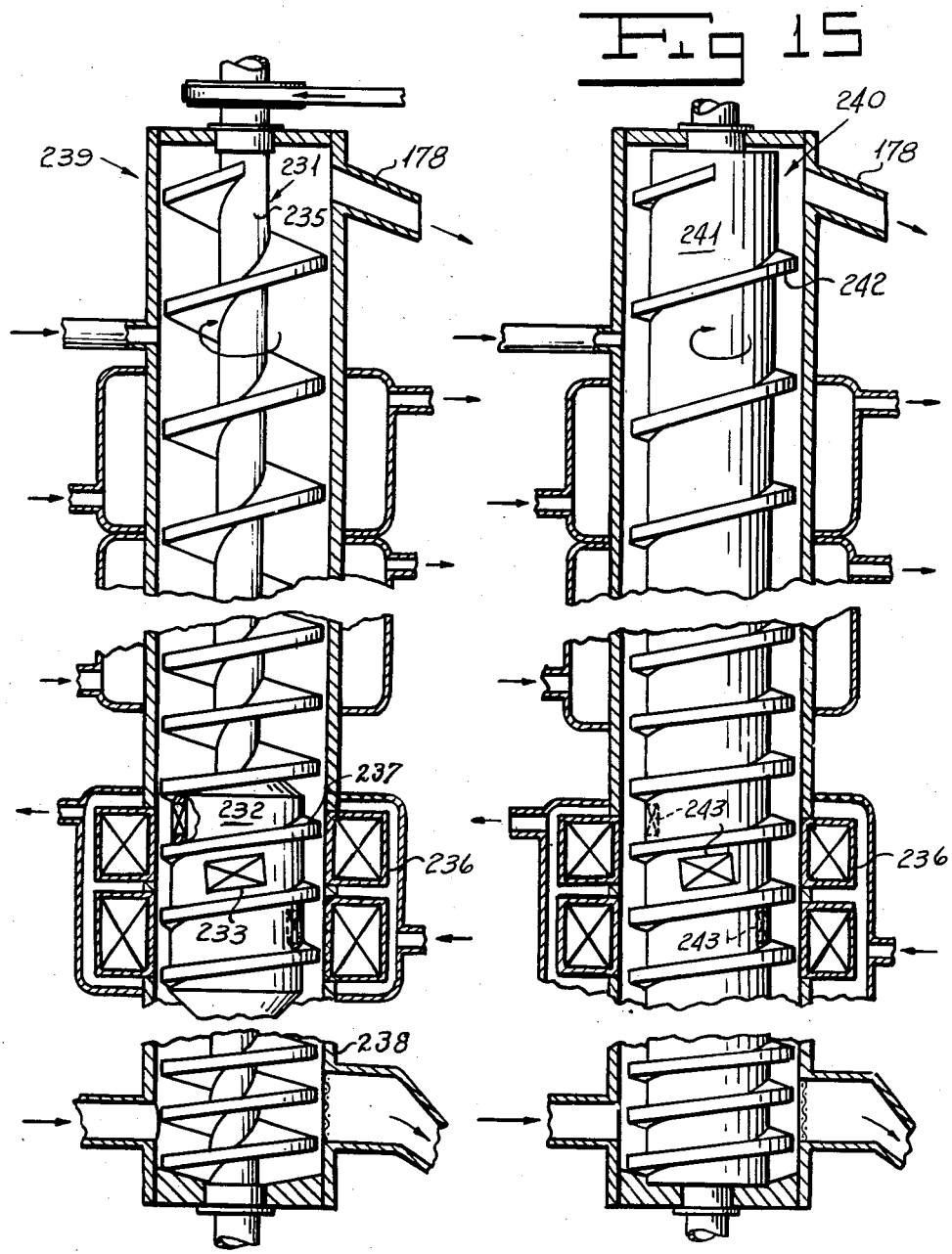

United States Patent Office 2,949,364
Patented Aug. 16, 1960

2,949,364

METHODS OF MAKING BEVERAGE CONCENTRATE

Eugene N. Bilenker, Livingston, N.J., assignor to Curtiss-Wright Corporation, a corporation of Delaware Filed Jan. 9, 1957, Ser. No. 633,216

17 Claims. (Cl. 99—71)

This invention relates generally to the method for producing a substantially dry soluble beverage product, and more particularly, instant coffee.

It has long been the desire of instant coffee manufacturers to attain a product which, when reconstituted with water, is indistinguishable from a freshly brewed cup of coffee.

All known instant coffee processes fail sufficiently to preserve the subtleties of taste and aroma which are the hallmark of the freshly brewed beverage.

The method provided by the present invention eliminates the undesirable features of known instant coffee processes.

The new concept as represented by the method of the present invention retains the maximum taste and aroma constituents of the original roasted coffee throughout the manufacturing process to provide a soluble instant coffee, which, when reconstituted with water, is indistinguishable from the freshly brewed beverage.

It is recognized that the damaging effects of the following factors have, in part, precluded the attainment of the desired instant coffee product:

(1) Excessive damaging heat.
(2) Excessive damaging contact between the coffee grounds and the extracting liquid.
(3) Loss of desirable volatile flavor constituents to the atmosphere.

After the above-mentioned damaging effects have been minimized or even eliminated, the resulting product, when dissolved in water, would not be comparable with freshly brewed coffee. However, the present invention not only substantially eliminates the above-mentioned damaging effects, but introduces new techniques and apparatus for attaining the desired taste and aroma quality and, additionally, provides subleties of taste and aroma novel to instant coffee.

The preponderance of commercial instant coffee manufacturing operations start with a hot water extraction and end with a hot drying operation. Obviously, these conventional procedures embrace the three major flavor damaging factors cited above.

A few known processes resort to cold extraction to protect heat-vulnerable desirable flavor constituents, but the method and means employed fail to yield a product which, when dissolved in water, approaches the quality of the freshly brewed beverage because the known cold extraction techniques elicit only a small fraction of the avaliable desirable flavor constituents. Further, the techniques for concentrating the liquid extract prior to drying often involve high temperatures and/or systems which favor the loss of volatile constituents to the atmosphere. Finally, the drying techniques often involve heat and/or atmospheric conditions which dissipate whatever small amounts of desirable flavor constituents which were obtained in the starting cold extraction step.

A feature of the present invention is to provide novel methods of obtaining a dry soluble concentrated beverage.

Another feature is to produce a novel dry concentrated beverage product by novel methods and means.

Other features and advantages of the invention include novel methods of producing a dry concentrated beverage product by blending the dried yield from cold extraction with the dried yield from hot extraction of the same starting batch of roasted coffee.

Other features of the invention embrace the substantially total release of cold extractables by unique extraction methods which may be applied as required to obtain the particular results desired.

The present invention contemplates a dry instant coffee product resulting from several novel techniques and apparatus. For example, the present invention has one phase wherein the techniques employed provide a new dry instant coffee product which is of such quality that it is commercially adaptable for blending with lower quality dry instant coffee products. Further, the invention embraces one phase which results in a dry soluble coffee product substantially by cold process means, which is thereafter blended with a dry soluble coffee product of a different quality obtained from the same starting batch of roasted coffee. Novel apparatus, including ultrasonic equipment, is employed in certain of the steps for treating the process material, which apparatus may be employed as desired, the steps including extraction and drying.

The foregoing and other objects and advantages of the invention will appear more fully hereinafter from a consideration of the detailed description which follows, taken together with the accompanying drawings wherein several embodiments of the invention are illustrated by way of example. It is to be expressly understood, however, that the drawings are for the purpose of illustration and description only and are not intended as a definition of the limits of the invention.

In the drawings:

Fig. 8 is a modification of Fig. 2 to add a short-time-high-temperature treatment in a closed system.

Fig. 9 is a modification of Fig. 2, wherein a slush freezing treatment precedes the cold drying of the high aroma extract.

Fig. 10 represents a process wherein a high aroma coffee variety and an intermediate aroma coffee variety are separately processed to yield their respective aroma levels of dry coffee extract, and thereafter all the separate dry extracts are blended with the low aroma dry extract to yield a complete instant coffee product.

Fig. 11 is a modification of Fig. 2, wherein a slurry of freshly roasted and ground coffee, comminuted in the presence of cold water to yield a fine suspension, passes through an ultrasonic cold extraction process, with the clarifier residue from the cold extract becoming the partially extracted grounds for the ensuing hot extraction.

Fig. 12 is a modification of Fig. 2, wherein a multiplicity of ultrasonic cold extractions are employed, each extraction being at a like or at a different cold temperature.

Fig. 13 is a modification of Fig. 2, wherein there is employed a pressing step for expelling cold extract from the partially extracted grounds as the grounds emerge from the ultrasonic cold extraction step.

Fig. 14 is a modification of Fig. 5, wherein the central shaft of the flight conveyor in the vicinity of the cylinder-mounted transducers is enlarged in cross-section to provide in conjunction with the cylinder a restricted annular space for obtaining desirable penetration of the ultrasonic energy into the mass of process material.

Fig. 15 is a modification of Fig. 14 and also affords the desired penetration of ultrasonic energy and, further, utilizes a conveyor assembly proportioned to minimize or otherwise control the residence time of process material in the ultrasonic extractor.

Figure 1:
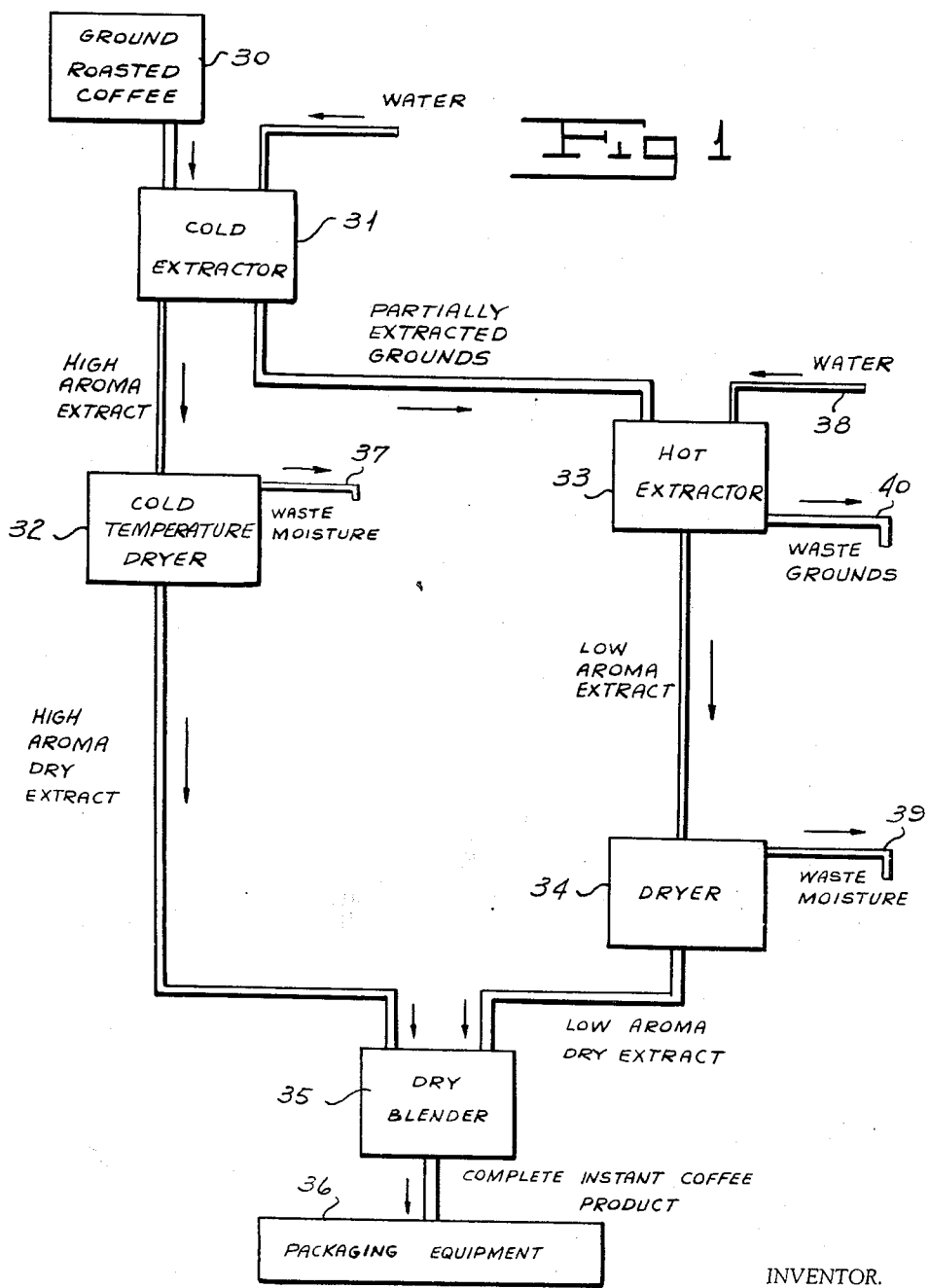
Fig. 1 is a block diagram showing the process of blending a high aroma dry extract with a low aroma dry extract.

Referring to the drawings, and more particularly to Fig. 1, there is shown a block diagram which illustrates the flow of the ground roasted coffee from a source 30 into a cold extractor 31, wherein the ground roasted coffee is subjected to extraction by cold water. The resulting high aroma liquid extract is separated from the partially extracted coffee grounds, and then is fed into a cold temperature dryer 32 where the moisture of the liquid extract is substantially totally removed to result in a high aroma dry extract, while the moisture is discharged as waste through the outlet 37. The cold extractor 31 may be of the batch, continuous, cocurrent, countercurrent, or any other suitable type. A suitable form of the cold temperature dryer 32 may be the continuous vacuum type where the moisture is evaporated from the extract while the extract is at cold temperatures.

The separated, partially extracted coffee grounds emerging from the cold extractor 31 are fed into a hot extractor 33, wherein hot water fed from inlet 38 extracts the remainder of soluble solids to yield a low aroma liquid extract. The residue of the substantially completely exhausted coffee grounds is discarded as waste through outlet 40. The low aroma liquid extract then is fed into a dryer 34, where the moisture of the liquid extract is substantially totally removed to result in a low aroma dry extract, while the waste moisture is disposed through outlet 39. The hot extractor 33 may be of the batch, continuous, cocurrent, countercurrent, or any other suitable type which permits the exhaustive hot extraction of soluble solids from the ground coffee. The dryer 34 preferably is of the low temperature type, but conventional high temperature dryers may be used.

The high aroma dry extract from the cold temperature dryer 32 and the low aroma dry extract from the dryer 34 are respectively metered as desired and fed into an appropriate dry blender 35, which may be of the single cone or twin cone tumbling type.

The output of the dry blender 35 is a complete instant coffee product, which thereafter is packaged as desired by suitable packaging equipment represented by block 36. The packaging equipment represented by block 36 includes all devices necessary to form the dry extract into desired shapes such as cubes or pellets, and to wrap, fill, or otherwise place into final form. The packages may range from very small portion sizes into bulk sizes, the latter being like drums.

Figure 2:
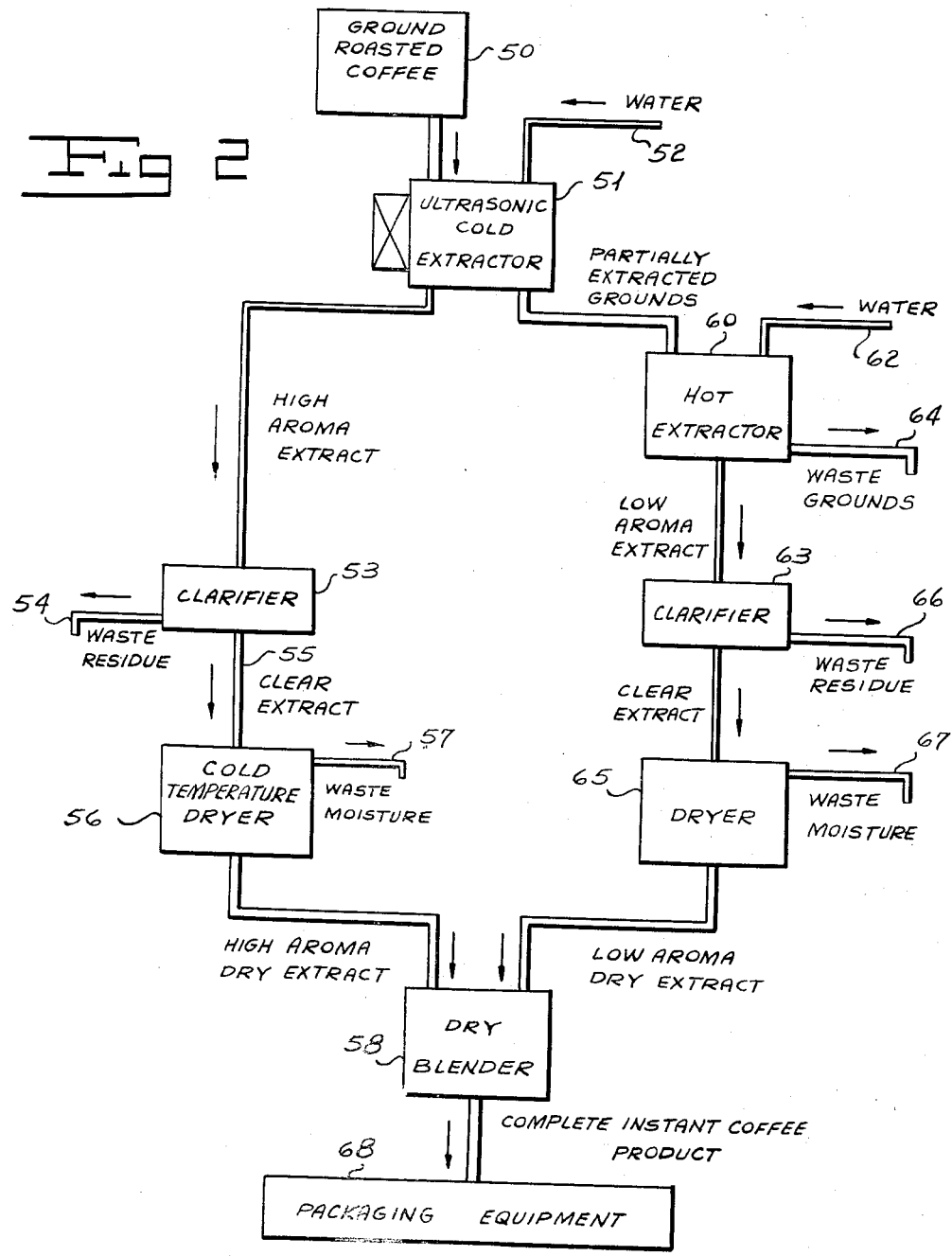
Fig. 2 is a modification of Fig. 1, wherein the step of cold extraction is ultrasonic.

The process represented in the flow chart or block diagram of Fig. 2 shows a ground roasted coffee source 50, from which is fed the ground coffee into an ultrasonic cold extractor 51, wherein the ground roasted coffee is subjected to ultrasonic insonation in the presence of water supplied from the inlet 52. The resulting high aroma liquid extract is separated from the partially extracted ground coffee, and then is fed into a clarifier 53, wherein the waste residue is removed from the clarifier via the waste residue outlet 54, and the clear extract is fed via conduit 55 into the cold temperature dryer 56. The waste moisture is removed from the cold temperature dryer via the waste moisture outlet 57. The high aroma dry extract is transferred from the cold temperature dryer 56 into the dry blender 58. The ultrasonic cold extractor 51 is equipped with suitably oriented transducers in batch, continuous, cocurrent, countercurrent, or other appropriate type of extractor. Three types of ultrasonic continuous countercurrent extractors are illustrated in Figs. 5, 6, 7, 14 and 15.

The partially extracted grounds removed from the ultrasonic cold extractor 51 are fed into the hot extractor 60, and in the presence of hot water fed from the water source inlet 62 result in a low aroma extract which is fed into the clarifier 63, while the waste grounds from the hot extractor 60 are removed via the outlet 64.

The clarifier 63 provides clear extract which is fed into the dryer 65, while the waste residue of the clarifier is removed through the outlet 66. The dryer 65 which removes the unwanted moisture from the clear extract via the waste moisture outlet 67 produces a low aroma dry extract which is fed into the dry blender 58 along with the high aroma dry extract in much the same manner as that represented in Fig. 1 by the block diagram or flow chart.

The output of the dry blender 58, which may be similar to the dry blender 35, is a complete instant coffee product which is packaged as desired by suitable packaging equipment represented by the block 68 in a manner similar to that shown by the equipment represented by block 36 of Fig. 1.

Figure 3:
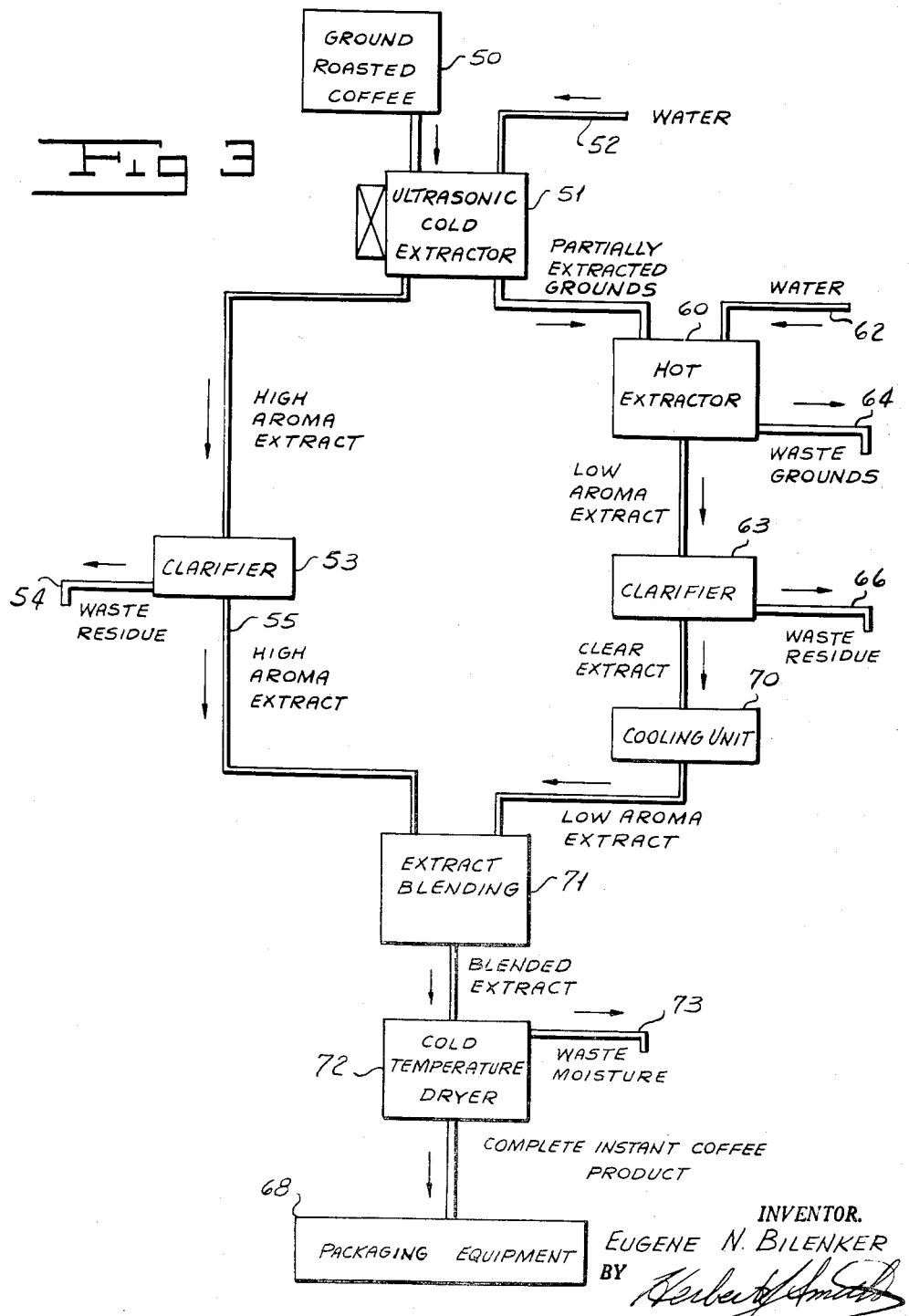
Fig. 3 is a block diagram showing an ultrasonic cold extraction with the blending being of liquid extracts instead of dry extracts.

The block diagram or flow chart shown in Fig. 3 has some blocks and parts which correspond to similar blocks and parts in Fig. 2. The blocks in Fig. 3 which are similar to those in Fig. 2 are given reference numerals like those in Fig. 2. In Fig. 3 the waste residue of clarifier 53 is discharged through outlet 54, while the usable output of the clarifier 53 is shown by legend as being high aroma extract. The output of the clarifier 63 has its waste residue discharged through the outlet 66, while the clear extract is fed into a cooling unit 70, with the output of said cooling unit being a low aroma extract. The high aroma extract from the clarifier 53 and the low aroma extract from the clarifier 63, via the cooling unit 70, are fed into the extract blending equipment represented by the block 71, wherein the high aroma extract and the low aroma extract are suitably blended, with the blended extract coming from the outlet of the extract blending equipment 71 being fed into the cold temperature dryer 72. The waste moisture from the cold temperature dryer is discharged via outlet 73. The output of the cold temperature dryer is fed into the packaging equipment 68, which may be similar to corresponding packaging equipment represented in Figs. 1 and 2. The cooling unit 70 may be a tubular heat exchanger or a plate heat exchanger if so desired, with the heat being removed by cold water, cold brine, or any other appropriate coolant. The extract blending equipment 71 may be an agitator equipped tank, and if desired may be protected from the air by maintaining an appropriate inert gas atmosphere in the head space of the tank. Several suitable alternatives to the tank type of blending equipment may be used for the extract blending step shown in block 71.

Figure 4:
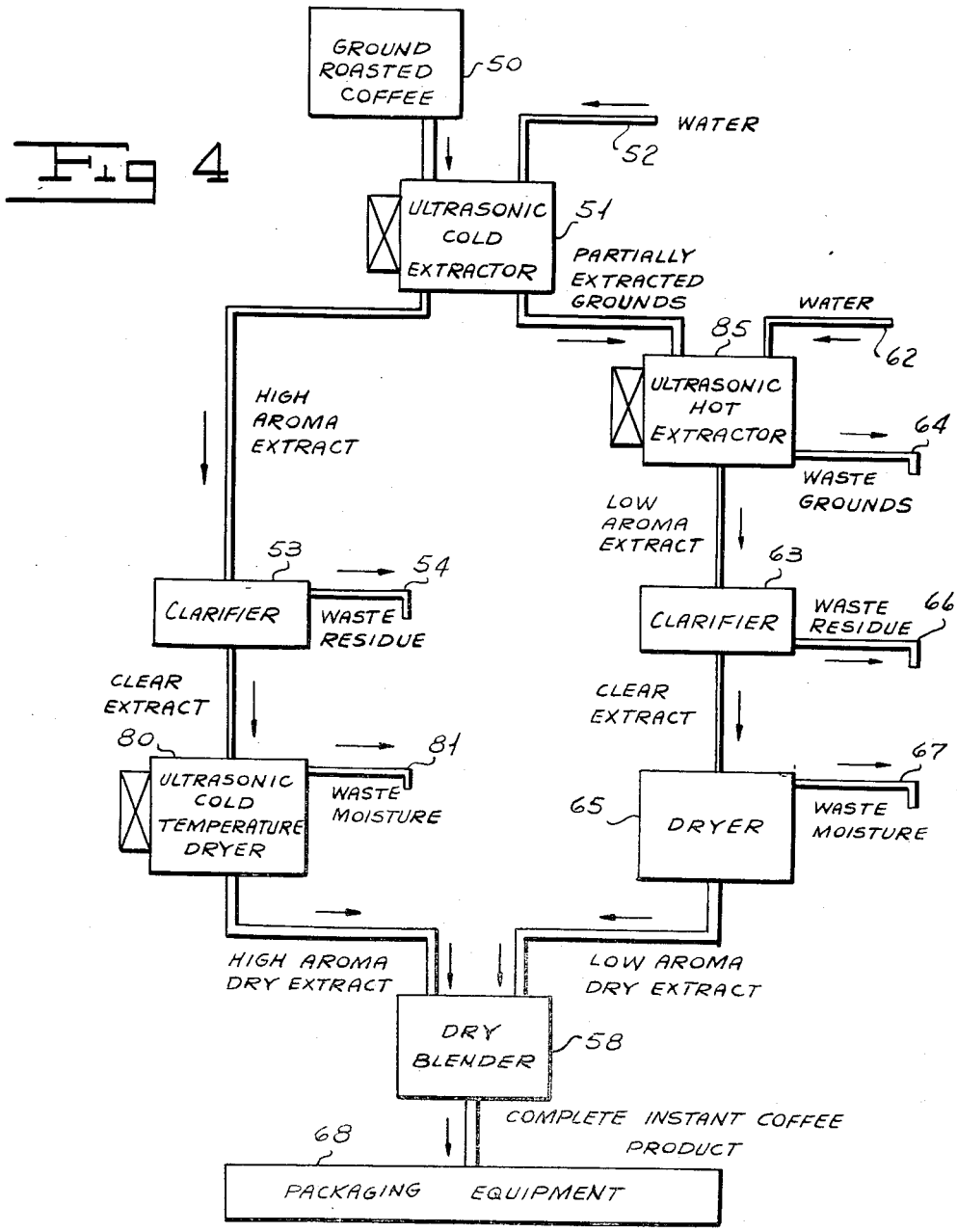
Fig. 4 is a modification of Fig. 2, wherein the cold temperature drying step and the hot extraction step each are modified to embody the ultrasonic principle.

Fig. 4 has certain blocks and parts which are substantially similar to those shown and described in relation to Fig. 2, and are given corresponding reference numerals.

In Fig. 4, while like parts function in like manner, the output of the clarifier 53 is fed into an ultrasonic cold temperature dryer 80, wherein the waste moisture is discharged through the outlet 81 and the high aroma dry extract is fed into the dry blender 58. The partially extracted grounds from the ultrasonic cold extractor 51 are fed into the ultrasonic hot extractor 85, which is connected with a hot water inlet 62 with the waste grounds being connected to the outlet 64. The low aroma extract resulting from processing in the ultrasonic hot extractor 85 is fed into the clarifier 63. The clarifier 63 discharges its waste residue at outlet 66, while the clear extract from the clarifier 63 flows to the dryer 65, which produces the low aroma dry extract which is fed into the dry blender 58. The high aroma dry extract from the ultrasonic cold temperature dryer 80 and the low aroma dry extract from the clarifier 63 via dryer 65 are, respectively, metered as desired prior to being fed into the dry blender 58. The ultrasonic hot extractor 85 is equipped with transducers suitably oriented to properly insonate the wetted ground coffee in a batch, continuous, cocurrent, countercurrent, or other appropriate extractor type. Jacketing, where provided, in each of the ultrasonic hot extractor types is with a suitable heating fluid. Figs. 5, 6, 7, 14, and 15 illustrate three ultrasonic continuous countercurrent types of extractors which may be used for the ultrasonic hot extraction step shown in block 85. The ultrasonic cold temperature dryer 80 employs ultrasonic transducers in contact with the cold liquid extract or frozen liquid extract while the extract is undergoing dehydration.

The process represented in the flow chart or block diagram of Fig. 8 utilizes certain elements which are similar to those shown in Fig. 2, said elements having like reference numerals for corresponding parts, the corresponding parts of Fig. 2 and Fig. 8 including the ground roasted coffee source 50, the ultrasonic cold extractor 51 and its water inlet 52, the hot extractor 60, its water inlet 62 and waste grounds outlet 64, the clarifier 63 and its waste residue outlet 66, the dryer 65 and its waste moisture outlet 67, the dry blender 58, and the packaging equipment 68.

While the partially extracted grounds shown in the diagram of Fig. 8 are fed into the hot extractor, after the ultrasonic cold extraction step the cool high aroma extract from the ultrasonic cold extractor 51 is fed into the outer jacket 90 of a heat regenerator 91, with the outlet from said outer jacket being fed into the quick heater 92 having an outlet thereof feeding the hot extract via the conduit 93 into the inner chamber 29 of the heat regenerator 91. The cool extract cooled by passage through inner chamber 29 is fed therefrom via the outlet conduit 94 into the quick cooler 95. The purpose of the quick heating is to sterilize or pasteurize the extract and to cause cloud forming materials to precipitate for removal in the clarifier. The quick cooling prevents damage to the heat sensitive constituents present. The cold extract which is fed from the outlet of the quick cooler 95 is fed into a clarifier 96. The waste residue of the clarifier 96 is discharged through the waste residue outlet 97, while the clear extract is fed from the clarifier into the cold temperature dryer 98, with the waste moisture from said cold temperature dryer being discharged by way of outlet 99. The closed circuit 100 (represented by dotted line) embracing the heat regenerator, the quick heater, the quick cooler, and the clarifier, is merely a representative showing to indicate that said elements are connected in an enclosed system which prevents deterioration of the process material due to reaction with the air and also due to loss of desirable volatile constituents to the air. The heat regenerator 91 may be of the tubular, of the plate, or of any other desired type. The quick heater 92 is preferably of the tubular type with the heating medium being high pressure steam. The quick cooler 95 is preferably of the tubular type with the coolant preferably being cold brine.

The clear extract is fed from the clarifier 96 of Fig. 8 out of the closed system into a cold temperature dryer 98, which may be similar to the cold temperature dryer 72 of Fig. 3.

The high aroma dry extract fed from the cold temperature dryer 98 is fed into a dry blender 58, as is the low aroma dry extract from the dryer 65. A waste moisture outlet 99 of the dryer 98, is shown. The outputs from said cold temperature dryer 98 and dryer 65 are fed in metered amounts into the dry blender by any suitable or conventional equipment for measuring the input of the dry blender from its different sources.

The process represented in the flow chart of block diagram of Fig. 9, has certain representative blocks or steps similar to those in Fig. 8, with like blocks in Figs. 8 and 9 having like reference numerals. The partially extracted grounds from the ultrasonic cold extractor are fed into the hot extractor 60, and processed in a manner similar to that described in relation to Fig. 8.

The high aroma extract produced from the ultrasonic cold extractor 51 in the process represented in Fig. 9, is fed into a clarifier 110 with the waste residue discharged by way of outlet 111. The clear extract output from the clarifier 110 is fed into a slush freezer 112 with the output therefrom fed into an ice crystal separator 113, said output being slush of ice crystals and extract syrup, as shown by legend on the drawing of Fig. 9.

The slush freezing may be accomplished in any conventional way, such as in a heat exchanging device which is jacketed with low temperature cooling, such as with brine.

The clear extract from the clarifier 110 may enter the slush freezer equipment as a liquid stream, and emerge as a slush of ice crystals and concentrated extract syrup, shown by legend on the drawing. The ice crystals may be, in general, pure water with possibly some occluded extract syrup.

The ice crystal separator may be any suitable device which separates the ice crystals from the syrup generally by confining the ice crystals in a convenient or conventional manner, while permitting the extract syrup to pass through as an output product of the crystal separator. The basket centrifuge is a representative example of an ice crystal separator. The ice crystals from the separator 113 are fed, via conduit 114, back into the ultrasonic cold extractor 51 in a recycling process.

The extract syrup from the ice crystal separator 113 is passed into the cold temperature dryer 98 ready for a complete dehydration. The waste moisture from the cold temperature dryer 98 emerges via outlet 99, while the high aroma dry extract is fed in measured amounts through a conventional apparatus (not shown) into the dry blender 58, while the low aroma dry extract is also fed in measured amounts by conventional apparatus (not shown) into the dry blender 58. The resultant emerging from the dry blender is fed into the packaging equipment 68 as heretofore explained.

The processes discussed heretofore in relation to the present invention have referred to coffee in general, without mentioning any particular quality of coffee. However, because of the aroma and flavor losses in the heretofore known processes, the conventional instant coffee is made from low aroma dry extract produced, in large, from the cheapest low aroma coffee beans available. Naturally, it would be wasteful to process high aroma expensive types of coffee when the aroma is destroyed in the severe hot processes now in general use.

The ultrasonic cold extraction process makes it possible to include aromatic coffee beans, which when processed in accordance with the techniques and teachings of the present invention, result in a vastly superior flavored instant coffee product.

Desirable utilization of high aroma coffee beans may be obtained by processing same separately in the ultrasonic extraction step, with the partially exhausted solids then being reprocessed to provide a dry extract which is used with the resultant dry extract powder from the ultrasonic cold extraction. Further, several varieties of coffee processed in accordance with techniques of the present invention may be employed to produce a desirable single instant coffee end product. For example, a high aroma coffee variety, a medium aroma coffee variety, and a low aroma coffee variety may be individually processed, with either or both of the high aroma and medium aroma coffee varieties being subjected to the ultrasonic cold extraction, which yield, respectively, high and medium aroma dry extracts. The partially extracted ground coffee after the ultrasonic cold extraction step, is further processed in combination with an unextracted low aroma coffee variety by a hot extraction step to obtain a product which may be blended with the higher aroma dry extracts.

In Fig. 10 there is shown by way of the flow chart or block diagram a process for blending different varieties of coffees in their dry extract form. Blocks 120, 121 and 122 represent the sources of high aroma coffee variety, medium aroma coffee variety, and low aroma coffee variety, respectively. The high aroma coffee is fed through various steps represented by the roaster 123, the grinder 124, ultrasonic cold extractor 125, clarifier 126, is the cold temperature dryer 127, and then into a dry blender 128, in measured amounts by any suitable or conventional equipment. The medium aroma coffee variety is processed by steps represented by the roaster 130, the grinder 131, the ultrasonic cold extractor 132, the clarifier 133, the cold temperature dryer 134, and then in measured amounts is fed into the dry blender 128. The low aroma variety coffee is processed in steps represented by a roaster 140, a grinder 141, a hot extractor 142, a clarifier 143, a dryer 144, and then in measured amounts fed into the dry blender 128.

Partially extracted coffee grounds from the ultrasonic cold extractor 125 and the partially extracted coffee grounds from the ultrasonic cold extractor 132 may both be fed into the hot extractor 142, where said partially extracted coffee grounds are mixed with the ground low aroma coffee from the grinder 141 and subjected to the hot extraction step represented in block 142. Further, via conduit 150 some of the ground coffee from grinder 131, in measured amounts (using conventional equipment not shown), is fed into the hot extractor if this is desirable for producing the particular end product. The hot extractor, the clarifiers, the cold temperature dryers, and the dryer 144, may be suitable or conventional equipment which may be similar to that referred to heretofore in the instant application.

It will be seen by legend in the drawings that from the high aroma coffee variety there results a high aroma dry extract, from the medium aroma coffee variety there results a medium aroma dry extract, and from the low aroma coffee variety there results a low aroma dry extract, with the high, medium, and low aroma extracts being mixed in predetermined amounts in the dry blender 128. The resultant product from the dry blender is fed into the packaging equipment 68, which may be similar to the equipment referred to heretofore in the present application.

From the process represented by Fig. 10, it is possible to employ two or more qualities or varieties of coffee and blend them to obtain desired results. It is to be understood that while a specific arrangement is shown in relation to Fig. 10, ultrasonic equipment may be employed not only as shown in relation to the cold extractors but may be used in any of the other steps which have been referred to in relation to processes pertaining to showings in the other figures of the drawings. Various complete products may be formed by appropriate combinations of high aroma dry extracts, medium aroma dry extracts, low aroma dry extracts and intermediate flavor types. Each type of dry extract may have its origin in a suitable variety of coffee which has had a suitable pre-roasting preparation, and the desired degree of roast, and the appropriate grind which provides the optimum distribution of particle sizes. Numerous combinations of variety, quality and processing operations may be integrated to obtain any one of a wide assortment of instant coffee products.

In Fig. 11, the flow chart or block diagram shows a system which employs an ultrasonic cold extractor 51, a cold temperature dryer 56, a hot extractor 60, a clarifier 63, a dryer 65, a dry blender 58, and packaging equipment 68, all of which are represented in Fig. 2 and consequently are given corresponding reference numerals. Other elements in Fig. 11 which correspond to like elements in Fig. 2 are given reference numerals correspondingly.

In Fig. 11, the roasted coffee has a source 150 which feeds the coffe into a comminutor 151. Water from an inlet source 52 is fed into the comminutor and roasted coffee is ground in the presence of water. Comminution of the roasted coffee in the solvent contributes to the retention by the extracting solvent of released desirable flavor constituents. The subdivision of particles by the comminution treatment exposes greatly increased surface area to permit the particular quality of ultrasonic extraction. Simultaneous with comminution, there is a release of volatile constituents which are contacted and retained by the solvent.

The output of the comminutor embraces a suspension of very fine particles in water solvent which is fed into the ultrasonic cold extractor 51. The output from the ultrasonic cold extractor 51 is a suspension of very fine particles in extract which is fed into a clarifier 152. The clear high aroma extract from the clarifier 152 is fed into the cold temperature dryer 56 and thence, in measured amounts, into the dry blender 58. The partially extracted coffee grounds from the clarifier are then fed into the hot extractor 60 and the extract from the hot extractor passes through the clarifier 63 and the dryer 65 before being fed, in measured amounts, into the dry blender 58 as a low aroma dry extract. The output from the cold temperature dryer 56 is a high aroma dry extract. The output of the dry blender 58 is fed into the packaging equipment 68.

The clarifier 152 yields a clear syrup and a residue. Here, the residue is not discarded as waste, but because of its remaining desirable soluble solids, receives further processing in the hot extractor 60 as shown in Fig. 11. Suitable dispersion of the clarifier residue may be utilized to obtain the desired efficiency of extraction in the hot extractor 60.

In the flow chart or block diagram represented in Fig. 12, certain of the elements correspond with like elements in Fig. 2, said corresponding elements or blocks having like reference numerals. In the showing represented by Fig. 12, the ground roasted coffee source 50 is fed into the ultrasonic cold extractor 51, and in the presence of water from the inlet 52, is subjected to ultrasonic cold extraction. The high aroma extract from the cold extractor 51 is fed into the clarifier 53, with the output thereof fed as clear extract into the cold temperature dryer 162. The partially extracted coffee grounds resulting from the ultrasonic cold extraction, as shown in the step represented by block 51, is fed into a second ultrasonic cold extractor 160, and in the presence of water from the water inlet 161, is subjected to a second ultrasonic cold extraction. The extract output from the ultrasonic cold extractor 160 is fed into the clarifier 163 having a waste residue outlet 164, with the output of said clarifier being fed into the cold temperature dryer 162. The clear extract from both the clarifier 53 and the clarifier 163 is dried in the cold temperature dryer 162 and emerges therefrom as a high aroma dry extract which is fed in measured amounts into the dry blender 58.

The partially extracted grounds from the ultrasonic cold extractor 160 are fed into the hot extractor 60 with the output therefrom being a low aroma extract which is fed into the clarifier 63, the output of said clarifier being a clear extract which is fed into the dryer 65 and then, in measured amounts, into the dry blender 58. The high aroma dry extract from the cold temperature dryer 162 and the low aroma dry extract from the dryer 65 are blended in the dry blender 58, with the resultant product being fed into the packaging equipment 68.

It will be seen from Fig. 12 that the ultrasonic cold extractor 51 has the partially extracted grounds therefrom subjected to the action of a second ultrasonic cold extractor, with the extract output from both extractors 51 and 160 being individually subjected to the clarifier, and then the clear extracts are simultaneously subjected to the action of the cold temperature dryer 162. The input of the hot extractor 60 of the partially extracted grounds, in the showing of Fig. 12, has been subjected to two different stages of ultrasonic cold extraction.

The process represented in Fig. 13 has certain blocks which corresponds to blocks in Fig. 12, with the like blocks being given like reference numerals.

In Fig. 13, after the ground roasted coffee from the source represented by block 50 has been subjected to the ultrasonic cold extraction process represented by block 51, the high aroma extract is fed to the dry blender by way of the clarifier and cold temperature dryer substantially in the same manner as that represented in Fig. 12. The hot extraction process employs the hot extractor 60, the clarifier 63, and the dryer 65 before being fed into the dry blender 58. While the high aroma extract from the ultrasonic cold extractor 51 is fed to the clarifier 53, the partially extracted grounds in the present showing are fed into a press 165, with the high aroma extract being fed into the clarifier 163 and the output from said clarifier being fed as clear extract into the cold temperature dryer 162, which combines with the clear extract from clarifier 53 in the cold temperature dryer.

The press 165 may be a screw press, a box press, or any other suitable means operated at the desired pressure to obtain additional high aroma extract. Ultrasonically insonated ground coffee readily yields its extract to the pressing process. The extract obtained by pressing thus avoids the exposure of its heat labile desirable high aroma material to the ensuing hot extraction step.

The high aroma dry extract from the cold temperature dryer 162 and the low aroma dry extract from the dryer 65 are fed, in measured amounts, respectively, into the dry blender 58 and then presented to the packaging equipment represented in block 68.

Various forms and details of ultrasonic extractor means are shown in Figs. 5, 6, 7, 14, and 15.

Figure 5:
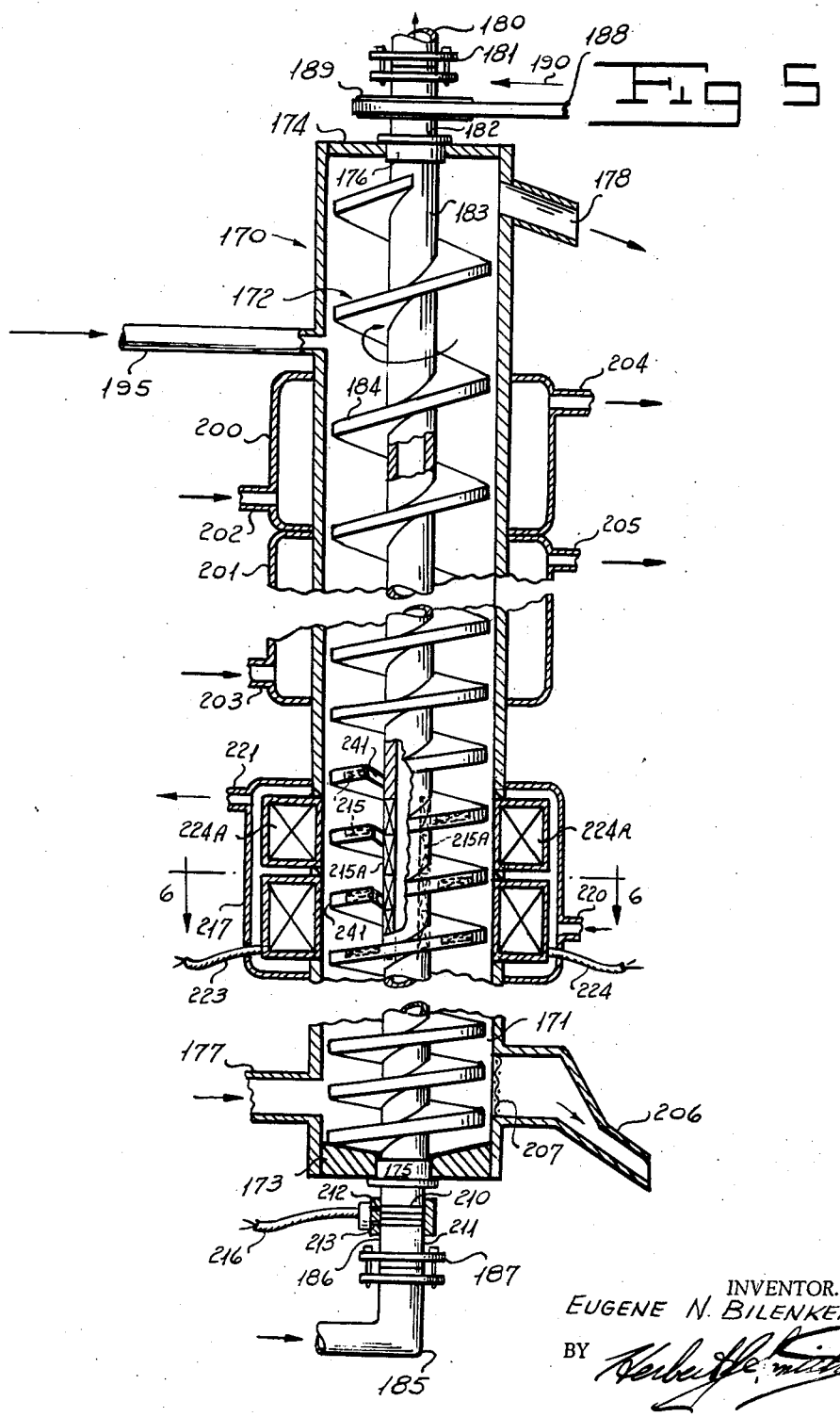
Fig. 5 shows a continuous extractor for insonation of the material to be processed.

Referring more particularly to Fig. 5, there is shown a form of ultrasonic extractor which is of the countercurrent type, wherein the solids to be processed are fed in at a first end, and move in a direction to be discharged through a second end, while the liquid to be used in the process is fed into the extractor adjacent the second end and discharged as a liquid extract adjacent or toward the first end.

In Fig. 5, there is shown an extractor 170, having a cylinder 171 with a conveyor assembly 172 including a hollow shaft journalled in the end plate structures 173 and 174, which structures are end portions for the cylinder 171. Journals or bearings 175 and 176 are carried by the end plate structures 173 and 174, respectively, for rotating therein the conveyor assembly 172, in the present instance, by the hollow shaft 183. A solids inlet 177 is connected with the lower end, in the present showing, of the extractor to permit the ground coffee or other solid material to be fed into the cylinder of the extractor, and a solids outlet 178 is disposed adjacent the opposite end of the cylinder to permit the solids which have been processed in the extractor to be discharged therethrough.

There is a stationary conduit 180, movably coupled by a coupling means 181 to the upper end 182 of the hollow shaft 183, which hollow shaft has a hollow conveyor or helical screw 184 formed thereon for the purpose of receiving the ground coffee or other solids at the lower portion of the cylinder and elevating it to the point where it is ejected or discharged through the solids outlet 178 after the partially extracted grounds or solids have been processed in the extractor. A second stationary conduit 185 is movably connected to the lower end 186 of the hollow shaft 183 by means of a coupling 187. By means of the fluid-tight couplings 181 and 187, the conveyor assembly 172 may be rotated by any suitable means such as by the belt 188 on the pulley 189 secured to the upper end 182 of the hollow shaft. In the present instance, the arrow 190 indicates that the conveyor assembly would be rotated in the direction shown, whereby the ground coffee or other solids would be moved upwardly from the inlet 177 to the outlet 178.

The liquid to be used in the extractor enters the cylinder 171 via the inlet 195, and with the extractor in an upright position, as shown in the drawings, the liquid will trickle downwardly due to gravitational flow, adequately wetting the ground coffee or other solid which is being fed upwardly through the cylinder by means of the conveyor assembly. A plurality of jackets, such as 200 and 201, have inlets 202 and 203 at the lower respective areas and outlets 204 and 205 in their upper respective areas. When used for ultrasonic cold extraction, a coolant such as brine may be fed into the jackets by way of their respective inlets, such as 202 and 203, and will be discharged via the respective outlets 204 and 205, said coolant being used for the purpose of keeping the wetted ground coffee or solids at reduced temperatures.

A liquid extract outlet 206 is connected to the cylinder 171 and has a mesh screen 207 connected across an open portion thereof in the area of the cylinder wall below the batteries of transducers for the purpose of retaining the ground coffee or other solid material within the cylinder so that the ground coffee might be worked upwardly by the conveyor assembly, but permitting the liquid extract to filter through the screen or mesh 207 so that said liquid extract may be carried on for further processing.

The stationary portions 180 and 185 are coupled to the movable conveyor assembly 172 by suitable coupling means so that the conveyor assembly may be rotated for the purpose of elevating the coffee between the solids inlet 177 and the solids outlet 178. Further, the hollow screw conveyor and the hollow shaft will be filled with the heat transfer agent or liquid for the purpose of effecting heat transfer as required. Metallic annular rings 210 and 211 are disposed on the end portion of the hollow shaft and are electrically insulated from each other and from said hollow shaft. Brushes such as 212 and 213, which may be made of carbon or the like, may engage the annular rings, commonly referred to as slip rings, for the purpose of supplying energy by conductors such as in cable 216 from a suitable source of energy such as an alternating current generator, preferably in the range of 19,000 kilocycles or above, to a multiplicity of transducers such as 215 located in the hollow helical screw and transducers 215A located in the hollow shaft 183.

The jacket 217 has an inlet 220 for receiving a coolant such as water and an outlet 221 for discharge of the water coolant of the jacket 217. The transducers, such as 215, may be coupled to the transducer source of alternating energy by conductors such as in cable 216, while the transducer such as 224A may be electrically connected to the same source or a different source of alternating current energy via power leads or cables 223 and 224.

Figure 6:
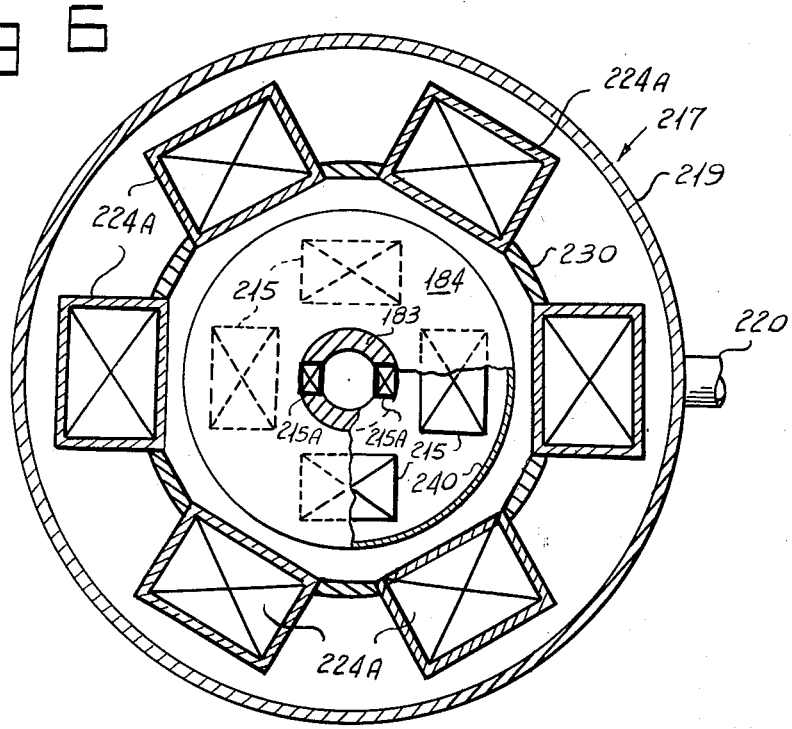
Fig. 6 is a sectional view taken substantially along lines 6—6 of Fig. 5.
Figure 7:
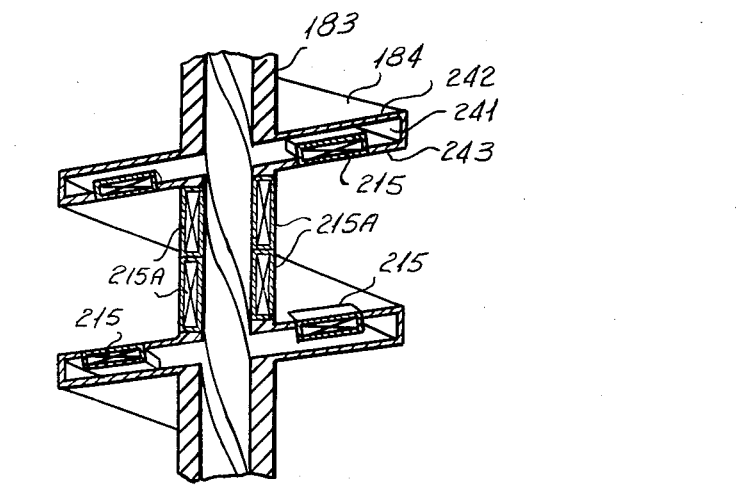
Fig. 7 is an enlarged sectional view of a portion of the conveyor assembly of Fig. 5, showing the hollow construction with transducers suitably oriented therein.

Figs. 6 and 7 are sectional views of Fig. 5 and show the jacket 217 for housing the transducers 224A about the cylinder 171 and having the coolant port or inlet 220. The transducers 224A are represented as being six in number, spaced equidistant about the jacket inner structure 230, as shown, with two banks of transducers being disposed within the jacket 217.

The hollow shaft 183 is shown having the helical screw 184 with four transducers 215 being disposed therein for one complete turn of the helical screw. Transducers 215A are shown positioned on opposite sides of the hollow shaft 183 between the turns of the helical screw 184. The sectional portion 240 is a horizontal section of a portion of the edge 241 of the helical screw. The space 241 between the upper and lower layers, respectively, 242 and 243 of the helical screw, house the transducers 215.

The transducers illustrated in Fig. 5 by 215A and 224A are suitably orientated to obtain the desired intensity and duration of the material under process insonation commensurate with the rate of introduction of solids, and the rate of introduction and temperature of solvent. The distribution of solids particle sizes, the peculiar absorbtive capacity of the particular solids, the characteristics of the material under process with respect to the attenuation of ultrasonic energy and other variables combine to determine the optimum ultrasonic and mechanical design of the extractor, and the utilization of the particular design during processing.

The transducers 224A in Fig. 5 may, if desired, be distributed through any appropriate portion of the entire length of the cylinder 171. Similarly, the transducers 215 and 215A may be placed in any appropriate quantity along the desired portion of the entire length of the helical screw 184 and the shaft 183. The energization of the transducers may be programmed as desired during the extraction cycle to suitably expose the material being processed. The geometry of the extraction equipment and the orientation of the transducers are determined by the ultrasonic field conditions commensurate with the particular ultrasonic extraction involved.

The hollow construction of the shaft 183 and the helical screw 184 permits the heating or cooling of the material in the extractor by utilization of a suitable heat exchanging fluid. Hollow construction of the shaft 183 and the helical screw 184 may be employed as a reflector of ultrasonic energy for more efficient insonation of the material in the extractor. Said desirable heating and cooling may be obtained by the passage of a suitable fluid through the jackets as illustrated by 200 and 201 in Fig. 5. The distribution of the jackets 200 and 201 and the portion of the cylinder which the jacket contacts are determined by the operating conditions peculiar to the material being processed, the efficiency desired, and the sought-for quality of product.

Figs. 14 and 15 have parts which are similar to those in Fig. 5 and said like parts are given like reference numerals in the drawings. However, in both Figs. 14 and 15, the conveyor assemblies are different from each other and from the conveyor assembly 172 of Fig. 5.

In Fig. 14, the assembly 171 and the various jackets with the drive means for the hollow shaft are substantially identical with those of Fig. 2. The hollow shaft assembly 231 has a hollow shaft portion 235, which is the same dimension at either end of the shaft but has an enlarged portion 232 with transducers therein 233 spaced in the approximate arrangement as that shown in Figs. 6 and 7. The transducers 236 may be similar to those shown in relation to Fig. 5. The enlarged portion of the shaft 232 is also hollow, as is the helical screw portion 237 within the effective area of the transducers 233 and 236. The enlarged area 232 of the hollow shaft assembly 231, with the exception of the portion having the helical screw thereon, within the effective area of the transducers, is substantially of the same inner and outer diameter, with the outer diameter of said portion 232 being substantially equidistantly spaced from the cylinder portion 238 of the extractor 239.

In Fig. 15, the jacket 236 for the transducers is substantially the same as that presented in Fig. 14. However, the conveyor assembly 240 is different from either of the conveyor assemblies in Figs. 5 and 14. In the conveyor assembly 241 of Fig. 15, the helical screw 242 is of the same approximate dimensions throughout the length of the shaft except that the mean distance between the screws actually varies in much the same manner as does the mean distance between the turns of the conveyor screw 184 of Fig. 5.

Figs. 14 and 15, respectively, illustrate hollow shaft designs which differ in proportion from the shaft 183 in Fig. 5. In Fig. 14 the enlarged portion of the shaft 232 provides a restricted annular space in the effective area of the battery of transducers 233 and 236. One of the benefits of this arrangement is a more thorough insonation of the material throughout the annular space in the region of the transducers 233 and 236. After leaving the restricted annular space, the solids may move at a slower rate through the remainder of the extractor, which, under certain operating conditions, is a desirable feature.

In Fig. 15, the uniformly enlarged hollow shaft provides a uniformly restricted annular space throughout the entire length of the extractor. This retains the ultrasonic insonation advantages of the restricted annular space while providing a uniform rate of propulsion to the material being processed. Desirable heat transfer and sonic reflection features are derived when applied, for example, to the rapid ultrasonic cold extraction of solvent-labile and heat-labile materials.

The word "ultrasonic" has been used throughout the specification, and it is to be understood that any suitable frequency either in the range of audible or above audible frequencies may be used for insonation of the process material.

Particularly useful frequencies for the insonation of some process materials have been utilized in the range of 16,000 cycles per second to 800,000 cycles per second.

The expression, cold temperature, is not intended to be a limitation. However, it is pointed out that temperatures in the range between 140° F. to —30° F. have been employed successfully. Preferred temperatures for some ultrasonic cold temperature extractions have been between —10° F. and 80° F.

While several embodiments of the invention have been illustrated and described in detail, it is to be expressly understood that invention is not limited thereto. Various changes can be made in the design and arrangement of the parts without departing from the spirit and scope of the invention as will now be understood by those skilled in the art.

What is claimed is:

1. In a process for producing a dry soluble coffee powder wherein roasted coffee is contacted with a relatively cool extraction medium in order to prepare a coffee infusion, the resulting coffee infusion is separated from the residue of extracted coffee, and the separated extract is thereafter dried to a powdered coffee product, the improvement comprising subjecting the roasted coffee while being extracted by means of the extraction medium to ultrasonic vibrations.

2. A process of preparing a dry soluble coffee powder of improved flavor and aroma characteristics comprising the steps of subjecting roasted coffee to extraction with an extraction medium while subjecting the coffee to ultrasonic vibrations under relatively low temperature conditions, separating the resulting mixture into a coffee extract and partially extracted coffee, subjecting the partially extracted coffee to a separate extraction step with relatively hot extraction medium, separating the coffee extract resulting from said relatively hot extraction step and combining same with the coffee extract resulting from the initial extraction step carried out under conditions of relatively low temperature, and drying the resulting combined extract.

3. A process for preparing a dry coffee extract having desirable characteristics comprising the steps of subjecting ground roasted coffee to extraction with an extraction medium while subjecting said coffee to insonation under relatively low temperature conditions, separating the resulting mixture into an extract and partially exhausted coffee solids, drying said extract, subjecting the partially exhausted coffee solids to a relatively hot extraction step with a relatively hot extraction medium while subjecting said partially exhausted coffee solids to insonation, separating a coffee extract from the product obtained from the relatively hot extraction step, converting same to dry extract coffee and combining same with dry extract coffee obtained from said extraction under relatively low temperature conditions.

4. A process as in claim 3 in which the extract obtained from the insonation under low temperature condition is subjected to further independent insonation while undergoing a step of drying.

5. A process as set forth in claim 4, wherein the further independent insonation step includes the step of cooling.

6. A process for producing a dry coffee extract having distinctive flavor and aroma characteristics comprising forming a slurry of freshly roasted finely divided coffee in the presence of cold liquid medium to yield a cold suspension of fine coffee particles, passing said suspension through an extraction zone in which the suspension is subjected to insonation to produce a suspension of coffee particles in coffee extract, separating the extract from the partially exhausted coffee solids, and drying same.

7. A process as defined in claim 6 in which the partially exhausted coffee solids is subjected to further extraction with a relatively hot extraction medium in order to produce a comparatively low aroma extract, drying the resulting extract to produce a low aroma dry extract, and blending the low aroma coffee dry extract thus obtained with the high aroma coffee dry extract obtained from the cold extraction step.

8. In a process for producing a dry soluble coffee powder having distinctive flavor and aroma characteristics wherein roasted coffee is contacted with a liquid medium in order to prepare a coffee infusion, the resulting coffee infusion is separated from the residue of extracted coffee, and the separated infusion is thereafter dried to a powdered coffee product, the improvement comprising subjecting the roasted coffee while being extracted by means of the liquid medium to insonation and relatively low temperature conditions while passing the roasted coffee and the liquid extracting medium continuously through the extraction zone, and flowing the aqueous extracting medium, while passing through said extraction zone, through a region of relatively restricted cross section adjacent the source of insonation.

9. In a process for producing a dry soluble coffee powder having excellent flavor and aroma characteristics wherein roasted coffee is contacted with an aqueous medium in order to prepare a coffee infusion, the resulting coffee infusion is separated from the residue of extracted coffee, and the separated extract infusion is thereafter dehydrated to a powdered coffee product, the improvement comprising subjecting the roasted coffee while being extracted by means of the aqueous medium to ultrasonic vibrations and relatively low temperature.

10. A process for producing a dry soluble coffee powder having desirable flavor and aroma characteristics comprising the steps of contacting roasted coffee with a relatively cool extraction medium while under the influence of ultrasonic vibrations in order to prepare a coffee infusion, separating the resulting coffee infusion from the residue of extracted coffee, raising the temperature of the separated coffee infusion to a relatively high temperature in a relatively short time, cooling the heated coffee infusion in a relatively short time, and thereafter drying the cooled coffee infusion to a dried coffee product.

11. A process for producing a dry soluble coffee powder having desirable flavor and aroma characteristics comprising contacting roasted coffee with an aqueous medium while subjecting the coffee to ultrasonic vibrations under conditions of temperature not greatly in excess of room temperature, separating the resulting coffee infusion from the residue of extracted coffee, cooling the separated coffee infusion until a slush of ice crystals in concentrated coffee extract syrup is formed, separating the ice crystals from the residual concentrated coffee syrup, and drying the said concentrated extract syrup to a coffee powder.

12. A process as set forth in claim 11 in which the drying step is carried out under conditions of cold temperature drying in vacuo.

13. In a process for producing a dry soluble coffee powder wherein roasted coffee is contacted with a relatively cool extraction medium in order to prepare a coffee infusion, the resulting coffee infusion is separated from the residue of extracted coffee, and the separated extract is thereafter dried to a powdered coffee product; the improvement comprising subjecting the roasted coffee while being extracted by means of the extraction medium to ultrasonic vibrations, and drying the extract at a relatively low temperature.

14. A process as defined in claim 2 wherein said drying step is performed at a relatively low temperature.

15. A process for preparing a dry coffee extract having desirable characteristics comprising the steps of subjecting ground roasted coffee to extraction with an extraction medium while subjecting said coffee to insonation under relatively low temperature conditions, separating the resulting mixture into an extract and partially exhausted coffee solids, drying said extract, subjecting the partially exhausted coffee solids to a relatively hot extraction step with a relatively hot extraction medium, separating a coffee extract from the product obtained from the relatively hot extraction step, converting same to dry extract coffee and combining same with dry extract coffee obtained from said extraction under relatively low temperature conditions.

16. A process as defined in claim 15 wherein the extract obtained from the extraction under relatively low temperature conditions is dried at a relatively low temperature.

17. A process for producing a dry soluble coffee powder having improved flavor and aroma characteristics comprising contacting roasted coffee with a relatively cool extraction medium and in the presence of ultrasonic vibrations in order to produce a coffee infusion, separating the resulting coffee infusion from the residue of extracted coffee, subjecting the residue of extracted coffee to high pressure in order to expel residual liquid coffee extract from said residue to produce a high aroma extract, combining said coffee infusion and said high aroma extract to form a combined extract, drying said combined extract to produce a high aroma coffee powder, passing the residue of extracted coffee after the pressing step through a hot extraction zone where it is contacted with a hot extraction medium in order to produce a lower aroma coffee extract, drying the lower aroma coffee extract to a lower aroma coffee powder, and blending the high aroma coffee powder with the lower aroma coffee powder.

References Cited in the file of this patent

UNITED STATES PATENTS

| | | |
|---|---|---|
| 1,079,474 | Davis | Nov. 25, 1913 |
| 2,162,033 | Schulze | June 13, 1939 |
| 2,389,732 | Kellogg | Nov. 27, 1945 |
| 2,410,157 | Fredrickson | Oct. 29, 1946 |
| 2,416,945 | Noyes | Mar. 4, 1947 |
| 2,420,615 | Palmer et al. | May 13, 1947 |
| 2,576,297 | Horsley | Nov. 27, 1951 |
| 2,587,556 | Weiss et al. | Feb. 26, 1952 |
| 2,619,024 | Flosdorf et al. | Nov. 25, 1952 |
| 2,629,663 | Fogler | Feb. 24, 1953 |
| 2,775,434 | Probst | Dec. 25, 1956 |
| 2,830,904 | Arentoft et al. | Apr. 15, 1958 |

OTHER REFERENCES

Tea and Coffee Trade Journal, May 1955, pp. 30, 32 and 34 (page 30 only is relied upon).